US006641733B2

(12) United States Patent
Zha et al.

(10) Patent No.: US 6,641,733 B2
(45) Date of Patent: *Nov. 4, 2003

(54) APPARATUS AND METHOD FOR CLEANING MEMBRANE FILTRATION MODULES

(75) Inventors: Fufang Zha, Westmead (AU); Edward John Jordan, Overland Park, KS (US)

(73) Assignee: U. S. Filter Wastewater Group, Inc., Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/303,447

(22) Filed: Nov. 21, 2002

(65) Prior Publication Data

US 2003/0075504 A1 Apr. 24, 2003

Related U.S. Application Data

(63) Continuation of application No. 09/815,966, filed on Mar. 23, 2001, now Pat. No. 6,524,481, which is a continuation of application No. PCT/AU99/00817, filed on Sep. 24, 1999.

(30) Foreign Application Priority Data

Sep. 25, 1998 (AU) ............................................. PP 6217
Jun. 21, 1999 (AU) ............................................. PQ 1112

(51) Int. Cl.[7] ............................................. B01D 65/02
(52) U.S. Cl. .................. 210/615; 210/150; 210/321.69; 210/636; 210/650
(58) Field of Search ................................ 210/150, 151, 210/274, 275, 321.65, 321.69, 605, 615, 617, 631, 636, 637, 650, 651, 791, 797, 620

(56) References Cited

U.S. PATENT DOCUMENTS

| 5,607,593 | A | * | 3/1997 | Cote et al. ................... 210/636 |
| 5,639,373 | A | * | 6/1997 | Mahendran et al. ........ 210/636 |
| 5,910,250 | A | * | 6/1999 | Mahendran et al. ........ 210/636 |
| 5,944,997 | A | * | 8/1999 | Pedersen et al. ............ 210/636 |
| 6,156,200 | A | * | 12/2000 | Zha et al. .............. 210/321.69 |
| 6,524,481 | B2 | * | 2/2003 | Zha et al. ................... 210/636 |
| 6,555,005 | B1 | * | 4/2003 | Zha et al. ................... 210/636 |

* cited by examiner

Primary Examiner—Joseph Drodge
(74) Attorney, Agent, or Firm—Knobbe Martens Olson & Bear LLP

(57) ABSTRACT

A method and apparatus for cleaning a membrane module, the membrane module having a plurality of porous membranes, the membranes being arranged in close proximity to one another and mounted to prevent excessive movement therebetween and means for providing, from within the module, by means other than gas passing through the pores of the membranes, gas bubbles entrained in a liquid flow such that, in use, the liquid and bubbles entrained therein move past the surfaces of the membranes to dislodge fouling materials therefrom, the gas bubbles being entrained in the liquid by flowing the liquid past a source of gas to draw the gas into the liquid flow. The gas bubbles are preferably entrained into the liquid using a venturi type device. The membranes are preferably partitioned into discrete groups to assist cleaning while maintaining high packing density.

35 Claims, 7 Drawing Sheets

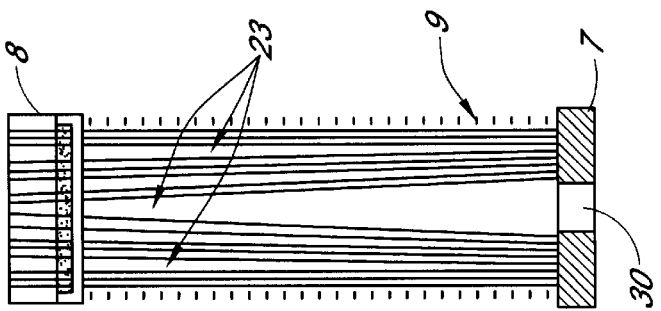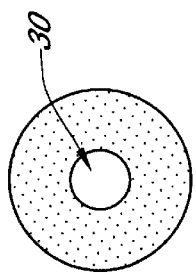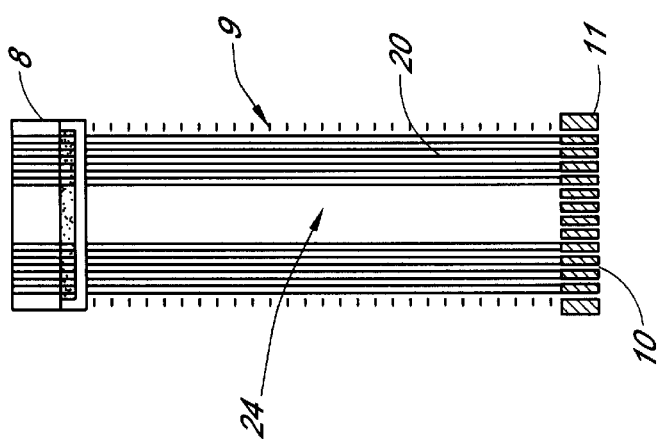

APPARATUS AND METHOD FOR CLEANING MEMBRANE FILTRATION MODULES

This application is a continuation of application Ser. No. 09/815,966,filed Mar. 23, 2001,now U.S. Pat. No. 6,524, 481, which is a continuation under 35 U.S.C. §120 of International Patent Application No. PCT/AU99/00817 filed on Sep. 24, 1999 under the Patent Cooperation Treaty (PCT), which was published by the International Bureau in English on Apr. 6, 2000, which designates the U.S. and claims the benefit of Australian Provisional Patent Application No. PP 6217 filed on Sep. 25, 1998, Australian Provisional Patent Application No. PP 6218 filed on Sep. 25, 1998, and Australian Provisional Patent Application No. PQ 1112 filed on Jun. 21, 1999.

TECHNICAL FIELD

The present invention relates to an apparatus and the related method to effectively clean membrane modules by means of a mixture of gas and liquid formed by a venturi, jet or the like. For membrane modules to be applied to an environment of high concentration of suspended solids, for example, in bioreactors, several improved module configurations are described to reduce solid accumulation within a module.

BACKGROUND OF THE INVENTION

The importance of membrane for treatment of waste water is growing rapidly. It is now well known that membrane processes can be used as an effective tertiary treatment of sewage and provide quality effluent. However, the capital and operating cost can be prohibitive. With the arrival of submerged membrane processes where the membrane modules are immersed in a large feed tank and filtrate is collected through suction applied to the filtrate side of the membrane, membrane bioreactors combining biological and physical processes in one stage promise to be more compact, efficient and economic. Due to their versatility, the size of membrane bioreactors can range from household (such as septic tank systems) to the community and large-scale sewage treatment.

The success of a membrane filtration process largely depends on employing an effective and efficient membrane cleaning method. Commonly used physical cleaning methods include backwash (backpulse, backflush) using a liquid permeate or a gas, membrane surface scrubbing or scouring using a gas in the form of bubbles in a liquid. Examples of the second type of method is illustrated in U.S. Pat. No. 5,192,456 to Ishida et al, U.S. Pat. No. 5,248,424 to Cote et al, U.S. Pat. No. 5,639,373 to Henshaw et al, U.S. Pat. No. 5,783,083 to Henshaw et al and our PCT Application No. WO98/28066.

In the examples referred to above, a gas is injected, usually by means of a pressurised blower, into a liquid system where a membrane module is submerged to form gas bubbles. The bubbles so formed then travel upwards to scrub the membrane surface to remove the fouling substances formed on the membrane surface. The shear force produced largely relies on the initial gas bubble velocity, bubble size and the resultant of forces applied to the bubbles. The fluid transfer in this approach is limited to the effectiveness of the gas lifting mechanism. To enhance the scrubbing effect, more gas has to be supplied. However, this method has several disadvantages: it consumes large amounts of energy, possibly forms mist or froth flow reducing effective membrane filtration area, and may be destructive to membranes. Moreover, in an environment of high concentration of solids, the gas distribution system may gradually become blocked by dehydrated solids or simply be blocked when the gas flow accidentally ceases.

For most tubular membrane modules, the membranes are flexible in the middle (longitudinal direction) of the modules but tend to be tighter and less flexible towards to both potted heads. When such modules are used in an environment containing high concentrations of suspended solids, solids are easily trapped within the membrane bundle, especially in the proximity of two potted heads. The methods to reduce the accumulation of solids include the improvement of module configurations and flow distribution when gas scrubbing is used to clean the membranes.

In the design of a membrane module, the packing density of the tubular membranes in a module is an important factor. The packing density of the fibre membranes in a membrane module as used herein is defined as the cross-sectional potted area taken up by the fibre membranes divided by the total potted area and is normally expressed as a percentage. From the economical viewpoint it is desirable that the packing density be as high as possible to reduce the cost of making membrane modules. In practice solid packing is reduced in a less densely packed membrane module. However, if the packing density is too low, the rubbing effect between membranes could also be lessened, resulting in less efficient scrubbing/scouring of the membrane surfaces. It is thus desirable to provide a membrane configuration which assists removal of accumulated solids while maximising packing density of the membranes.

SUMMARY OF THE INVENTION

The present invention, at least in its embodiments, seeks to overcome or least ameliorate some of the disadvantages of the prior art or at least provide the public with a useful alternative.

According to one aspect, the present invention provides a method of scrubbing a membrane surface using a liquid medium with gas bubbles entrained therein, including the steps of entraining said gas bubbles into said liquid medium by flow of said liquid medium past a source of said gas, and flowing said gas bubbles and liquid medium along said membrane surface to dislodge fouling materials therefrom.

Preferably, the gas bubbles are entrained into said liquid stream by means of a venturi device. For further preference, the gas bubbles are entrained or injected into said liquid stream by means of devices which forcibly mix gas into a liquid flow to produce a mixture of liquid and bubbles, such devices including a jet, nozzle, ejector, eductor, injector or the like. Optionally, an additional source of bubbles may be provided in said liquid medium by means of a blower or like device. The gas used may include air, oxygen, gaseous chlorine or ozone. Air is the most economical for the purposes of scrubbing and/or aeration. Gaseous chlorine may be used for scrubbing, disinfection and enhancing the cleaning efficiency by chemical reaction at the membrane surface. The use of ozone, besides the similar effects mentioned for gaseous chlorine, has additional features, such as oxidising DBP precursors and converting non-biodegradable NOM's to biodegradable dissolved organic carbon.

According to a second aspect, the present invention provides a membrane module comprising a plurality of porous membranes, said membranes being arranged in close proximity to one another and mounted to prevent excessive movement therebetween, and means for providing, from within the module, by means other than gas passing through the pores of said membranes, gas bubbles entrained in a liquid flow such that, in use, said liquid and bubbles entrained therein move past the surfaces of said membranes to dislodge fouling materials therefrom, said gas bubbles being entrained in said liquid by flowing said liquid past a source of gas to draw the gas into said liquid flow.

Preferably, said liquid and bubbles are mixed and then flowed past membranes to dislodge the fouling materials.

According to one preferred form, the present invention provides a method of removing fouling materials from the surface of a plurality of porous hollow fibre membranes mounted and extending longitudinally in an array to form a membrane module, said membranes being arranged in close proximity to one another and mounted to prevent excessive movement therebetween, the method comprising the steps of providing, from within said array, by means other than gas passing through the pores of said membranes, uniformly distributed gas bubbles entrained in a liquid flow, said gas bubbles being entrained in said liquid flow by flowing said liquid past a source of gas so as to cause said gas to be drawn and/or mixed into said liquid, said distribution being such that said bubbles pass substantially uniformly between each membrane in said array to, in combination with said liquid flow, scour the surface of said membranes and remove accumulated solids from within the membrane module. Preferably, said bubbles are injected and mixed into said liquid flow.

For preference, the membranes comprise porous hollow fibres, the fibres being fixed at each end in a header, the lower header having one or more holes formed therein through which gas/liquid flow is introduced. The holes can be circular, elliptical or in the form of a slot. The fibres are normally sealed at the lower end and open at their upper end to allow removal of filtrate, however, in some arrangements, the fibres may be open at both ends to allow removal of filtrate from one or both ends. The fibres are preferably arranged in cylindrical arrays or bundles. It will be appreciated that the cleaning process described is equally applicable to other forms of membrane such flat or plate membranes.

According to a further aspect the present invention provides a membrane module comprising a plurality of porous hollow fibre membranes, said fibre membranes being arranged in close proximity to one another and mounted to prevent excessive movement therebetween, the fibre membranes being fixed at each end in a header, one header having one or more of holes formed therein through which gas/liquid flow is introduced, and partition means extending at least part way between said headers to partition said membrane fibres into groups. Preferably, the partition means are formed by a spacing between respective fibre groups. The partitions may be parallel to each other or, in the case of cylindrical arrays of fibre membranes, the partitions may extend radially from the centre of the array or be positioned concentrically within the cylindrical array. In an alternative form, the fibre bundle may be provided with a central longitudinal passage extending the length of the bundle between the headers.

According to yet a further aspect, the present invention provides a membrane module for use in a membrane bioreactor including a plurality of porous hollow membrane fibres extending longitudinally between and mounted at each end to a respective potting head, said membrane fibres being arranged in close proximity to one another and mounted to prevent excessive movement therebetween, said fibres being partitioned into a number of bundles at least at or adjacent to their respective potting head so as to form a space therebetween, one of said potting heads having an array of aeration openings formed therein for providing gas bubbles within said module such that, in use, said bubbles move past the surfaces of said membrane fibres to dislodge fouling materials therefrom.

The fibre bundle is protected and fibre movement is limited by a module support screen which has both vertical and horizontal elements appropriately spaced to provide unrestricted fluid and gas flow through the fibres and to restrict the amplitude of fibre motion reducing energy concentration at the potted ends of the fibres.

Preferably, said aeration openings are positioned to coincide with the spaces formed between said partitioned bundles. For preference, said openings comprise a slot, slots or a row of holes. Preferably, the fibre bundles are located in the potting head between the slots or rows of holes.

For further preference, the gas bubbles are entrained or mixed with a liquid flow before being fed through said holes or slots, though it will be appreciated that gas only may be used in some configurations. The liquid used may be the feed to the membrane module. The fibres and/or fibre bundles may cross over one another between the potting heads though it is desirable that they do not.

Preferably, the fibres within the module have a packing density (as defined above) of between about 5 to about 70% and, more preferably, between about 8 to about 55%.

For preference, said holes have a diameter in the range of about 1 to 40 mm and more preferably in the range of about 1.5 to about 25 mm. In the case of a slot or row of holes, the open area is chosen to be equivalent to that of the above holes.

Typically, the fibre inner diameter ranges from about 0.1 mm to about 5 mm and is preferably in the range of about 0.25 mm to about 2 mm. The fibres wall thickness is dependent on materials used and strength required versus filtration efficiency. Typically wall thickness is between 0.05 to 2 mm and more often between 0.1 mm to 1 mm.

According to another aspect, the present invention provides a membrane bioreactor including a tank having means for the introduction of feed thereto, means for forming activated sludge within said tank, a membrane module according to the first aspect positioned within said tank so as to be immersed in said sludge and said membrane module provided with means for withdrawing filtrate from at least one end of said fibre membranes.

According to yet another aspect, the present invention provides a method of operating a membrane bioreactor of the type described in the second aspect comprising introducing feed to said tank, applying a vacuum to said fibres to withdraw filtrate therefrom while periodically or continuously supplying gas bubbles through said aeration openings to within said module such that, in use, said bubbles move past the surfaces of said membrane fibres to dislodge fouling materials therefrom. Preferably, the gas bubbles are entrained or mixed with a liquid flow when fed through said holes or slots.

If required, a further source of aeration may be provided within the tank to assist microorganism activity. For preference, the membrane module is suspended vertically within the tank and said further source of aeration may be provided beneath the suspended module. Preferably, the further source of aeration comprises a group of air permeable tubes. The membrane module may be operated with or without backwash depending on the flux. A high mixed liquor of suspended solids (5,000 to 20,000 ppm) in the bioreactor has been shown to significantly reduce residence time and improve filtrate quality. The combined use of aeration for both degradation of organic substances and membrane cleaning has been shown to enable constant filtrate flow without significant increases in transmembrane pressure while establishing high concentration of MLSS. The use of partitioned fibre bundles enables higher packing densities to be achieved without significantly compromising the gas scouring process. This provides for higher filtration efficiencies to be gained.

BRIEF DESCRIPTION OF THE DRAWINGS

Preferred embodiments of the invention will now be described, by way of example only, with reference to the accompanying drawings in which:

FIG. 3b shows a section through the membrane bundle of FIG. 3a;

FIG. 4b shows a section through the membrane bundle of FIG. 4a;

FIG. 5a shows a schematic side elevation of a partitioned membrane module according to another embodiment of the present invention;

FIG. 5b shows a section through the membrane bundle of FIG. 5a;

FIG. 6a shows a schematic side elevation of a partitioned membrane module according to another embodiment of the present invention;

FIG. 6b shows a section through the membrane bundle of FIG. 6a;

DETAILED DESCRIPTION OF THE PREFERRED EMBODIMENT

Figure 1:
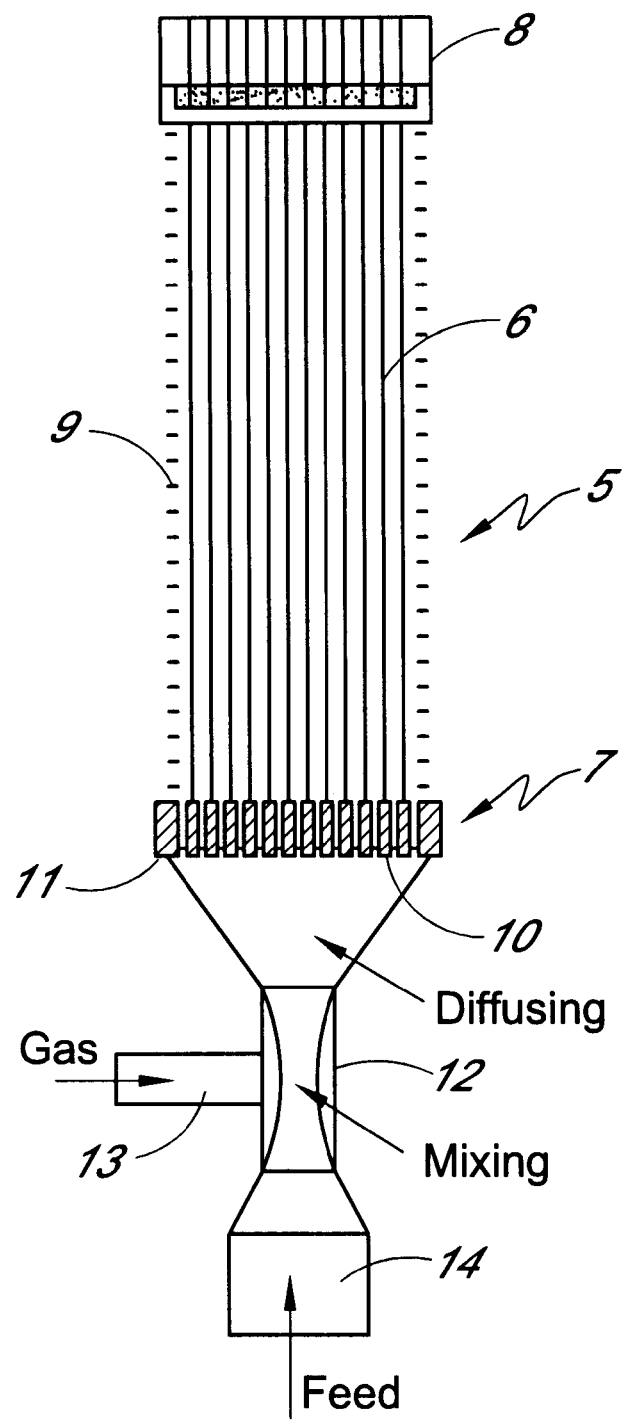
FIG. 1 shows a schematic side elevation of one embodiment of a membrane module and illustrates the method of cleaning according to the invention.

Referring to the drawings, the embodiments of the invention will be described in relation to a membrane module of the type disclosed in our earlier PCT application No. WO98/28066 which is incorporated herein by cross-reference, however, it will be appreciated that the invention is equally applicable to other forms of membrane module. The membrane module 5 typically comprises fibre, tubular or flat sheet form membranes 6 potted at two ends 7 and 8 and encased in a support structure, in this case a screen 9. Either one or both ends of the membranes may be used for the permeate collection. The bottom of the membrane module has a number of through apertures 10 in the pot 11 to distribute a mixture of gas and liquid feed past the membrane surfaces.

Referring to the embodiment shown in FIG. 1, a venturi device 12 or the like is connected to the base of the module. The venturi device 12 intakes gas through inlet 13, mixes or entrains the gas with liquid flowing through feed inlet 14, forms gas bubbles and diffuses the liquid/gas mix into the module apertures 10. After passing through the distribution apertures 10, the entrained gas bubbles scrub membrane surfaces while travelling upwards along with the liquid flow. Either the liquid feed or the gas can be a continuous or intermittent injection depending on the system requirements. With a venturi device it is possible to create gas bubbles and aerate the system without a blower. The venturi device 12 can be a venturi tube, jet, nozzle, ejector, eductor, injector or the like.

Figure 2:
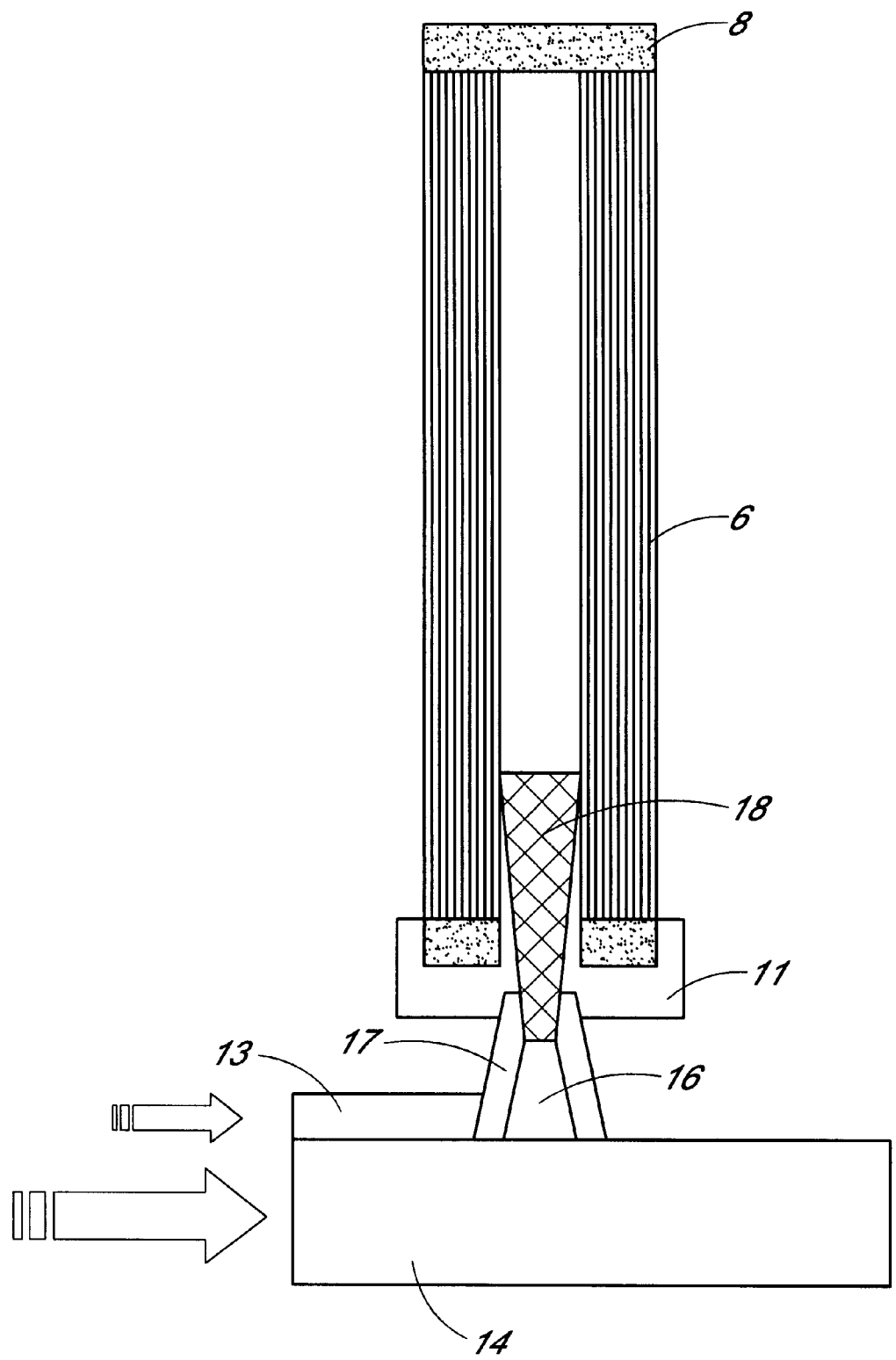
FIG. 2 shows an enlarged schematic side elevation of one form of the jet type arrangement used to form entrained gas bubbles.

Referring to FIG. 2, an enlarged view of jet or nozzle type device 15 is shown. In this embodiment, liquid is forced through a jet 16 having a surrounding air passage 17 to produce a gas entrained liquid flow 18. Such a device allows the independent control of gas and liquid medium by adjusting respective supply valves.

The liquid commonly used to entrain the gas is the feed water, wastewater or mixed liquor to be filtered. Pumping such an operating liquid through a venturi or the like creates a vacuum to suck the gas into the liquid, or reduces the gas discharge pressure when a blower is used. By providing the gas in a flow of the liquid, the possibility of blockage of the distribution apertures 10 is substantially reduced.

The present invention at least in its preferred embodiments may provide a number of advantages which may be summarised as follows:

1. By using a venturi device or the like it is possible to generate gas bubbles to scrub membrane surfaces without the need for a pressurised gas supply such as a blower. When a motive fluid passes through a venturi it generates a vacuum to draw the gas into the liquid flow and generate gas bubbles therein. Even if a blower is still required, the use of the above process reduces the discharge pressure of the blower and therefore lowers the cost of operation.

2. The liquid and gas phases are well mixed in the venturi and then diffuse into the membrane module to scrub the membranes. Where a jet type device is used to forcibly mix the gas into the liquid medium, an additional advantage is provided in that a higher velocity of bubble stream is produced. In treatment of wastewater, such thorough mixing provides excellent oxygen transfer when the gas used is air or oxygen. If the gas is directly injected into a pipe filled with a liquid, it is possible that the gas will form a stagnant gas layer on the pipe wall and therefore gas and liquid will bypass into different parts of a module, resulting in poor cleaning efficiency.

3. The flow of gas bubbles is enhanced by the liquid flow along the membrane resulting in a large scrubbing shear force being generated. This method of delivery of gas/liquid provides a positive fluid transfer and aeration with the ability to independently adjust flow rates of gas and liquid.

4. The injection of a mixture of two-phase fluid (gas/liquid) into the holes of the air distribution device can eliminate the formation of dehydrated solids and therefore prevent the gradual blockage of the holes by such dehydrated solids.

5. The injection arrangement further provides an efficient cleaning mechanism for introducing cleaning chemicals effectively into the depths of the module while providing scouring energy to enhance chemical cleaning. This arrangement, in combination with the high packing density obtainable with the module configuration described, enables the fibres to be effectively cleaned with a minimal amount of chemicals.

6. The module configuration described allows a higher fibre packing density in a module without significantly increasing solid packing. This adds an additional flexibility that the membrane modules can be either integrated into the aerobic basin or arranged in a separate tank. In the latter arrangement, the advantage is a significant saving on chemical usage due to the small chemical holding in the tank and in labor costs because the chemical cleaning process can be automated. The reduction in chemicals used is also important because the chemicals, which may be fed back to the bio process, are still aggressive oxidisers and therefore can have a deleterious effect on bio process. Accordingly, any reduction in the chemical load present in the bio-process provides significant advantages.

7. The positive injection of a mixture of gas and liquid feed to each membrane module provides a uniform distribution of process fluid around membranes and therefore minimises the feed concentration polarisation during filtration. The concentration polarisation is greater in a large-scale system and for the process feed containing large amounts of suspended solids. The prior art systems have poor uniformity because the process fluid often enters one end of the tank and concentrates as it moves across the modules. The result is that some modules deal with much higher concentrations than others resulting in inefficient operation.

8. The filtration efficiency is enhanced due to a reduced filtration resistance. The feed side resistance is decreased due to a reduced transverse flow passage to the membrane surfaces and the turbulence generated by the gas bubbles and the two-phase flow.

9. Such a cleaning method can be used to the treatment of drinking water, wastewater and the related processes by membranes. The filtration process can be driven by suction or pressurisation.

Figure 3A:
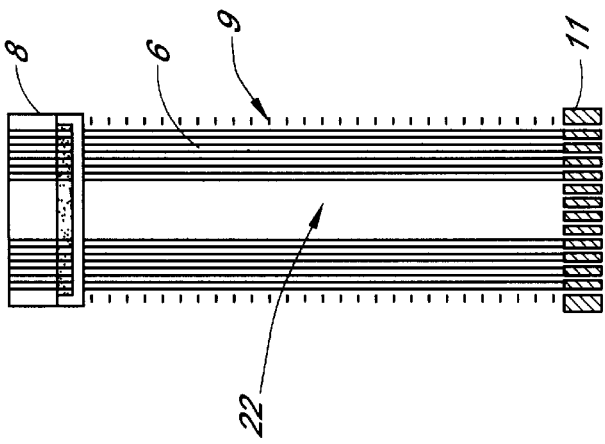
FIG. 3a shows a schematic side elevation of a partitioned membrane module according to one embodiment of the present invention.
Figure 3B:
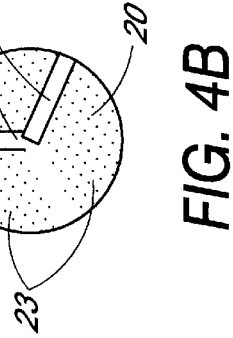
Figure 4A:
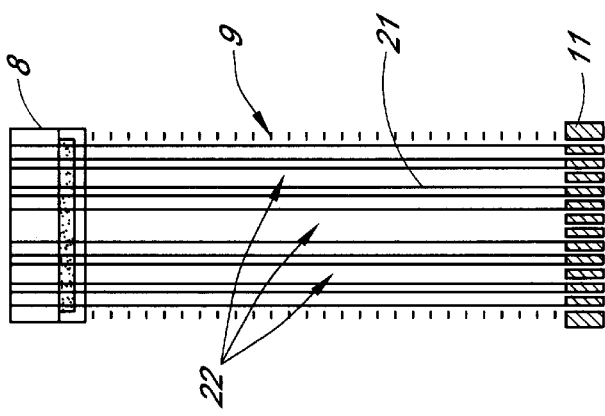
FIG. 4a shows a schematic side elevation of a partitioned membrane module according to a further embodiment of the present invention.
Figure 4B:
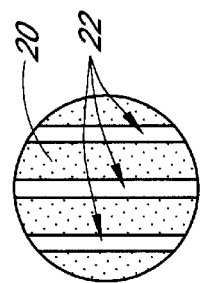

Referring to FIGS. 3 to 5, embodiments of various partitioning arrangements are shown. Again these embodiments are illustrated with respect to cylindrical tubular or fibre membrane bundles 20, however, it will be appreciated that the invention is not limited to such applications.

FIG. 3 shows a bundle of tubular membranes 20 partitioned vertically into several thin slices 21 by a number of parallel partition spaces 22. This partitioning of the bundle enables accumulated solids to be removed more easily without significant loss of packing density. Such partitioning can be achieved during the potting process to form complete partitions or partial partitions. Another method of forming a partitioned module is to pot several small tubular membrane bundles 23 into each module as shown in FIG. 4.

Another improved configuration of membrane module is illustrated in FIG. 5. The central membrane-free zone forms a passage 24 to allow for more air and liquid injection. The gas bubbles and liquid then travel along the tubular membranes 20 and pass out through arrays of fibres at the top potted head 8, scouring and removing solids from membrane walls. A single gas or a mixture of gas/liquid can be injected into the module.

FIG. 6 illustrates yet a further embodiment similar to FIG. 5 but with single central hole 30 in the lower pot 7 for admission of the cleaning liquid/gas mixture to the fibre membranes 20. In this embodiment, the fibres are spread adjacent the hole 30 and converge in discrete bundles 23 toward the top pot 8. The large central hole 30 has been found to provide greater liquid flow around the fibres and thus improved cleaning efficiency.

Figure 8:
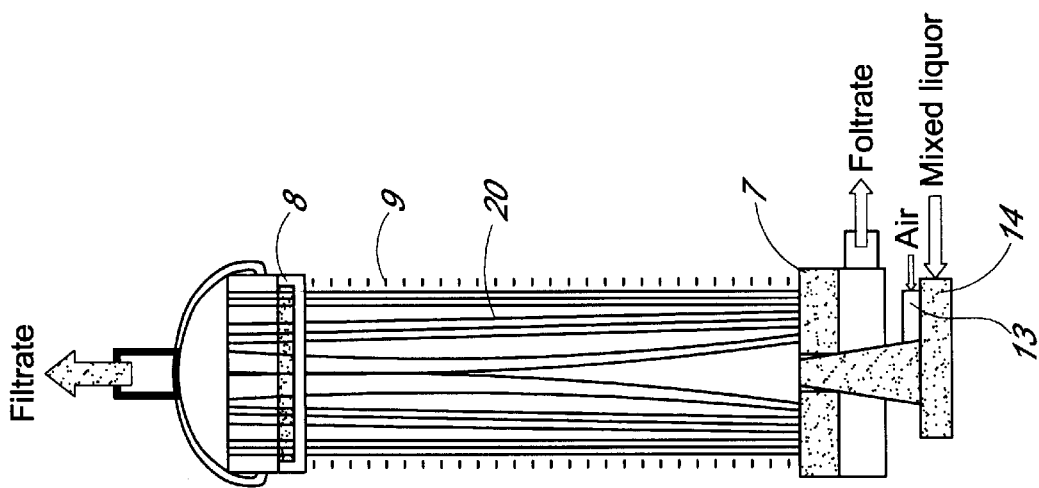
FIG. 8 shows a similar view to FIG. 2 of yet a further embodiment of the invention.
Figure 7:
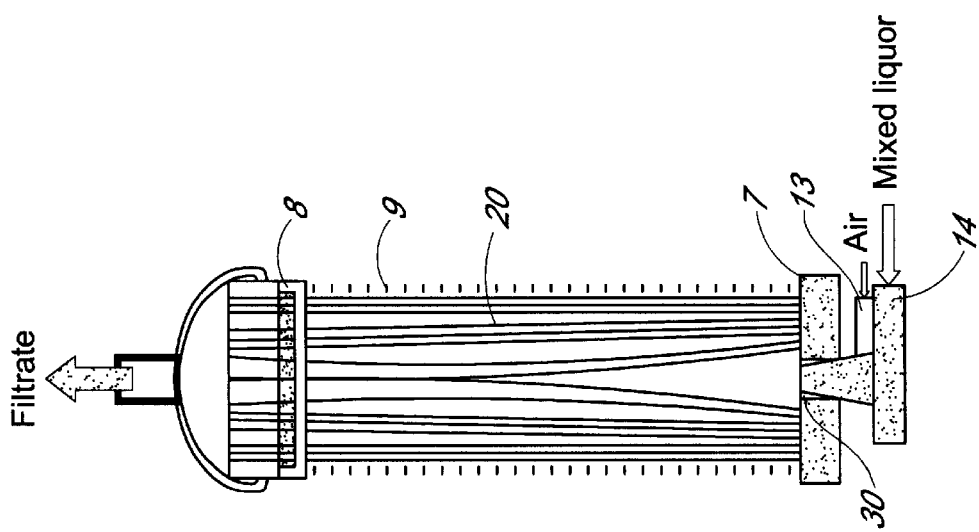
FIG. 7 shows a similar view to FIG. 2 of a further embodiment of the invention.

FIGS. 7 and 8 show further embodiments of the invention having a similar membrane configuration to that of FIG. 6 and jet mixing system similar to that of the embodiment of FIG. 2. The use of a single central hole 30 allows filtrate to drawn off from the fibres 20 at both ends as shown in FIG. 8.

Figure 9:
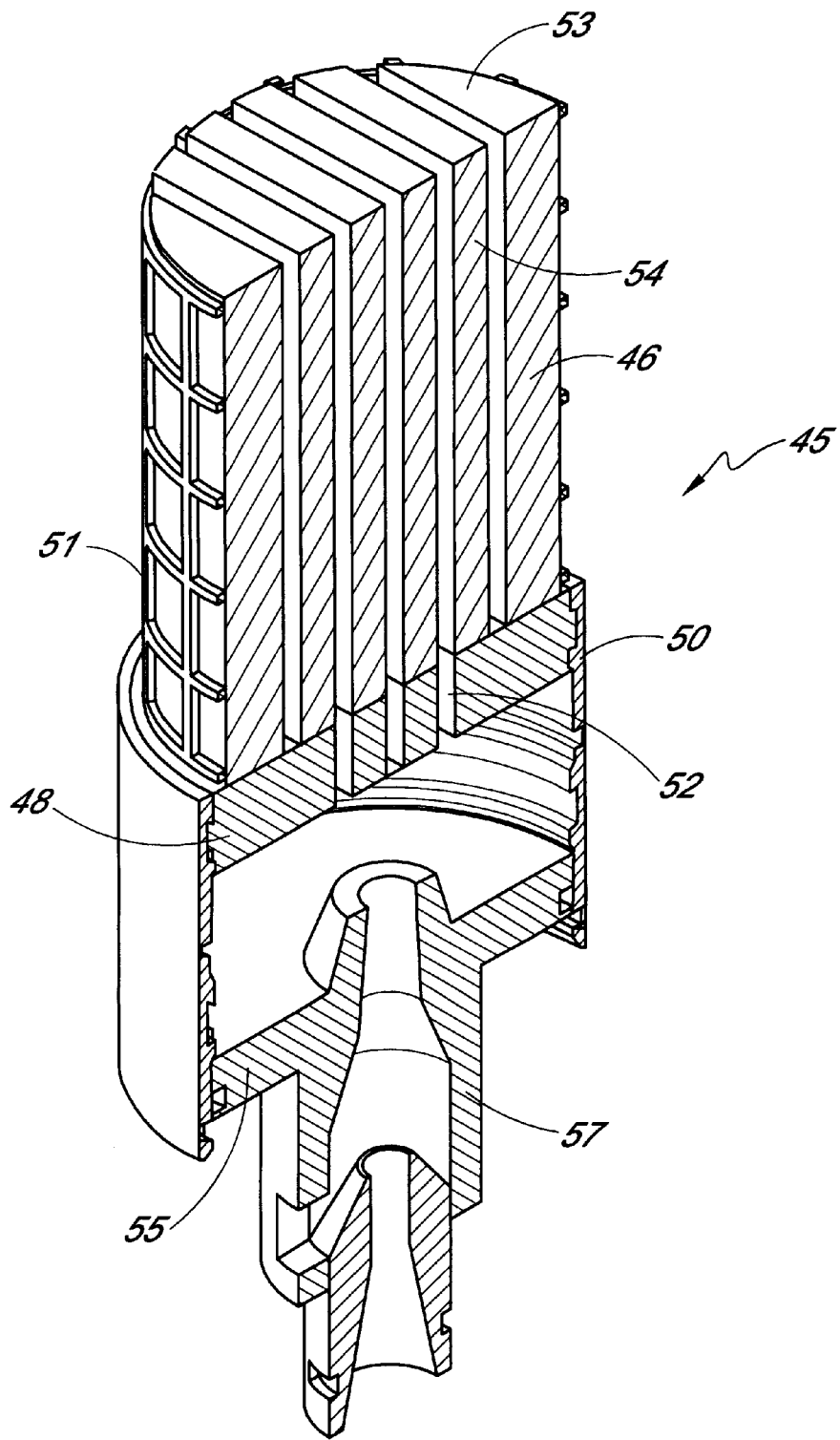
FIG. 9 shows a sectioned perspective pictorial view of the lower end of another preferred embodiment of the membrane module according to the invention.
Figure 10:
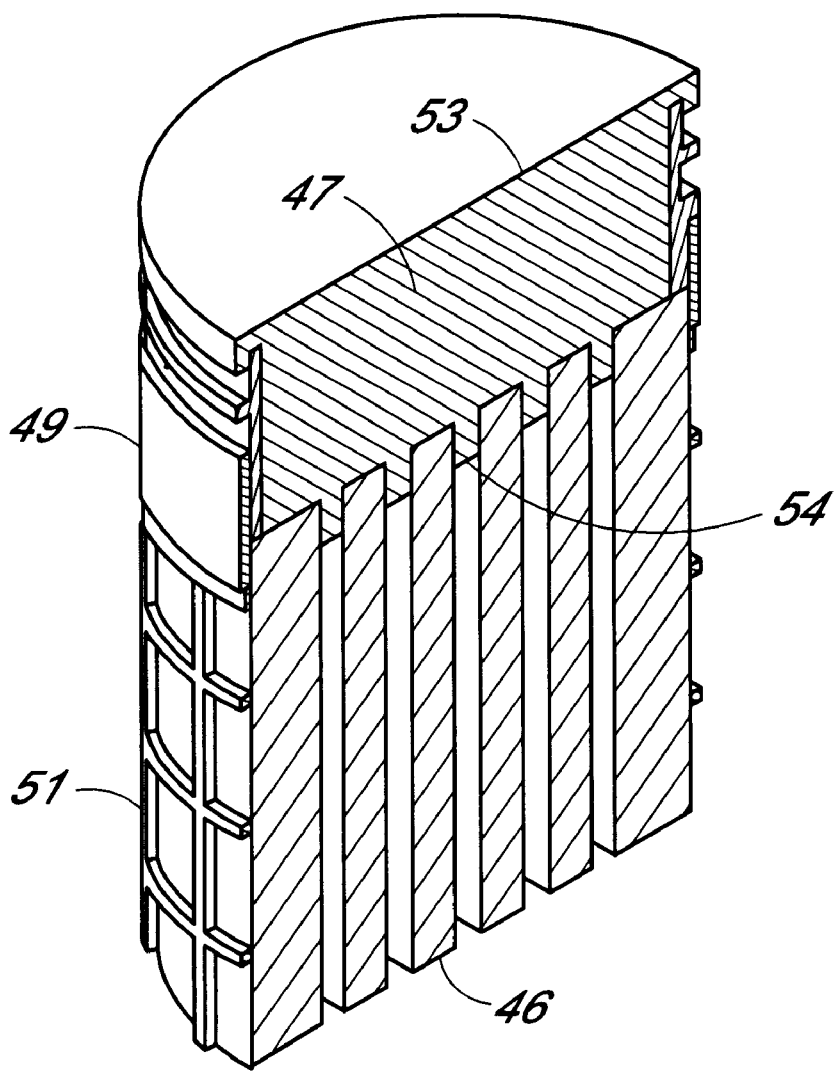
FIG. 10 shows a sectioned perspective pictorial view of the upper end of the membrane module of FIG. 9.

Referring to FIGS. 9 and 10 of the drawings, the module 45 comprises a plurality of hollow fibre membrane bundles 46 mounted in and extending between an upper 47 and lower potting head 8. The potting heads 47 and 48 are mounted in respective potting sleeves 49 and 50 for attachment to appropriate manifolding (not shown). The fibre bundles 46 are surrounded by a screen 51 to prevent excessive movement between the fibres.

As shown in FIG. 9, the lower potting head 48 is provided with a number of parallel arranged slot type aeration holes 52. The fibre membranes 53 are potted in bundles 46 to form a partitioned arrangement having spaces 54 extending transverse of the fibre bundles. The aeration holes 52 are positioned to generally coincide with the partition spaces, though there is generally a number of aeration holes associated with each space.

The lower potting sleeve 50 forms a cavity 55 below the lower pot 48. A gas or a mixture of liquid and gas is injected into this cavity 55 by a jet assembly 57 (described earlier) before passing through the holes 52 into the membrane array.

In use, the use of partitioning enables a high energy flow of scouring gas and liquid mixture, particularly near the pot ends of the fibre bundles, which assist with removal of buildup of accumulated solids around the membrane fibres.

Air is preferably introduced into the module continuously to provide oxygen for microorganism activities and to continuously scour the membranes. Alternatively, in some applications, pure oxygen or other gas mixtures may be used instead of air. The clean filtrate is drawn out of the membranes by a suction pump attached to the membrane lumens which pass through the upper pot as described in our earlier aforementioned application.

Preferably, the membrane module is operated under low transmembrane pressure (TMP) conditions because of the high concentration of suspended solids (MLSS) present in the reactor.

The membrane bioreactor is preferably combined with an anaerobic process which assists with further removal of nutrients from the feed sewage.

It has been found that the module system employed is more tolerant of high MLSS than many present systems and the efficient air scrub and back wash (when used) assists efficient operation and performance of the bioreactor module.

It will be appreciated that, although the invention and embodiments have been described in relation to an application to bioreactors and like systems, the invention may be equally applicable to other types of application.

It will be appreciated that the invention is not limited to the specific embodiments described and other embodiments and exemplifications of the invention are possible without departing from the sprit or scope of the invention.

What is claimed is:

1. A method of scrubbing a membrane surface using a liquid medium with a plurality of gas bubbles entrained therein, including the steps of:
   entraining a plurality of gas bubbles into a liquid medium by flow of the liquid medium and a gas into a junction, wherein the liquid medium comprises a cleaning chemical; and
   flowing the gas bubbles and liquid medium along a membrane surface to dislodge fouling materials therefrom.

2. The method according to claim 1, wherein the junction is selected from the group consisting of a venturi tube, a jet, a nozzle, an ejector, an eductor, and an injector.

3. The method according to claim 1, wherein the gas bubbles are entrained or injected into the liquid medium by at least one device which forcibly mixes a gas into the liquid medium to produce a mixture of liquid and gas bubbles.

4. The method according to claim 1, wherein the gas comprises a gas selected from the group consisting of air, oxygen, gaseous chlorine, and ozone.

5. A membrane module comprising a plurality of porous membranes, the membranes having a plurality of pores, the membranes being arranged in close proximity to one another and mounted to prevent excessive movement therebetween, and a junction connected to a header, a source of gas, and a source of a cleaning chemical for providing, from within the module, a plurality of gas bubbles entrained in a liquid flow, the liquid flow comprising the cleaning chemical, such that, in use, the liquid flow and bubbles entrained therein move past outer surfaces of the membranes to dislodge fouling materials therefrom.

6. The membrane module according to claim 5, further comprising an aerobic basin.

7. The membrane module according to claim 6, wherein the membrane module is at least partially immersed in the aerobic basin.

8. The membrane module according to claim 6, further comprising a tank separate from the aerobic basin, wherein the membrane module is at least partially immersed in the tank.

9. A method of removing fouling materials from the surface of a plurality of porous hollow fiber membranes, the method comprising:
   providing a membrane module comprising a plurality of porous hollow fiber membranes, the membranes mounted and extending longitudinally in an array to form a membrane module, the membranes having a plurality of pores, the membranes being arranged in close proximity to one another and mounted to prevent excessive movement therebetween; and
   providing, from within the array, a plurality of gas bubbles entrained in a substantially uniform distribution in a liquid flow, the liquid flow comprising a cleaning chemical, the gas bubbles being entrained in the liquid flow by flowing a gas and a liquid comprising a cleaning chemical into a junction connected to a header so as to cause the gas to be mixed into the liquid, the distribution being such that the gas bubbles pass substantially uniformly between each membrane in the array to, in combination with the liquid flow, scour outer surfaces of the membranes and remove accumulated solids from within the membrane module.

10. The method according to claim 9, wherein the junction is selected from the group consisting of a venturi tube, a jet, a nozzle, an ejector, an eductor, and an injector.

11. The method according to claim 9, wherein the membranes comprise porous hollow fibers, the fibers being fixed at a first end in a first header and at a second end in a second header, at least one header having one or more holes formed therein through which a gas flow or a gas and liquid flow is introduced.

12. A membrane module, the membrane module comprising:
   a source of a cleaning liquid, the cleaning liquid comprising a cleaning chemical;
   a source of a gas;
   a first header, the first header having one or more holes formed therein through which the gas and the liquid are introduced;
   a second header;
   a plurality of porous hollow fiber membranes, the porous hollow fiber membranes being arranged in close proximity and mounted to prevent excessive movement therebetween, the porous hollow fiber membranes being fixed at a first end in the first header and at a second end in the second header; and
   a junction, wherein the junction is connected to the first header, the source of the gas, and the source of the cleaning liquid.

13. The module according to claim 12, further comprising a partition, wherein the partition extends between the porous hollow fiber membranes, thereby partitioning the porous hollow fiber membranes into groups.

14. The module according to claim 12, wherein the partition is formed by a spacing between fiber groups.

15. The module according to claim 13, wherein the porous hollow fiber membranes are arranged in a cylindrical array and a plurality of partitions extend radially from a center of the array or are positioned concentrically within the cylindrical array.

16. A membrane module comprising a plurality of porous hollow fiber membranes and a junction connected to a first header and a source of a cleaning liquid, the cleaning liquid comprising a cleaning chemical, the fiber membranes being arranged in close proximity to one another to form a bundle and mounted to prevent excessive movement therebetween, the fiber membranes being fixed at a first end in the first header and at a second end in a second header, the first header having one or more holes formed therein through which a gas and the cleaning liquid are introduced, and the bundle having a central longitudinal passage extending a length of the bundle between the headers.

17. A membrane module comprising a plurality of porous hollow membrane fibers mounted at a first end to a first potting head and at a second end to a second potting head and extending longitudinally between the potting heads, the membranes having a plurality of pores, the membrane fibers being arranged in close proximity to one another and mounted to prevent excessive movement therebetween, the fibers being partitioned into one or more bundles at least at or adjacent to one of the potting heads so as to form a space therebetween, at least one of the potting heads having an array and a connection to a junction, wherein the junction is connected to a gas source and a source of a liquid comprising a cleaning chemical, the junction providing within the module, through a plurality of aeration openings formed in the array, a plurality of gas bubbles entrained within the liquid, such that, in use, the gas bubbles move past outer surfaces of the membrane fibers to dislodge fouling materials therefrom.

18. The membrane module according to claim 17, wherein the aeration openings are positioned to coincide with the spaces formed between the bundles.

19. The membrane module according to claim 18, wherein at least one aeration opening comprises a slot or a row comprising a plurality of holes, and wherein a bundle is located in at least one of the potting heads adjacent to the slot or row.

20. The membrane module according to claims 19, comprising at least two aeration openings, wherein a bundle is situated between the aeration openings.

21. The membrane module according to claim 19, comprising at least two bundles, wherein the slot or row is situated between the bundles.

22. The membrane module according to claim 19, wherein the holes have a diameter or an equivalent diameter averaging between about 1 mm and about 40 mm.

23. The membrane module according to claim 22, wherein the holes have a diameter or an equivalent diameter averaging between about 1.5 mm and about 25 mm.

24. The membrane module according to claim 17, wherein the fibers within the module have a packing density of between about 5 and about 70%.

25. The membrane module according to claim 24, wherein the packing density is between about 8 and about 55%.

26. The membrane module according to claim 17, wherein an inner diameter of the fibers averages between about 0.1 mm and about 5 mm.

27. The membrane module according to claim 26, wherein the inner diameter averages between about 0.25 mm and about 2 mm.

28. The membrane module according to claim 17, wherein a wall thickness of the fibers averages between about 0.05 and about 2 mm.

29. The membrane module according to claim 28, wherein the wall thickness averages between about 0.1 mm and about 1 mm.

30. A membrane bioreactor comprising:
   a source of a cleaning liquid comprising a cleaning chemical;
   a source of a gas;
   a membrane module, the membrane module comprising a first header, the first header having one or more holes formed therein through which the gas and the liquid are introduced; a second header; and a plurality of porous hollow fiber membranes, the porous hollow fiber membranes being arranged in close proximity and mounted to prevent excessive movement therebetween, the porous hollow fiber membranes being fixed at a first end in the first header and at a second end in the second header, the membrane module provided with means for withdrawing a filtrate from at least one end of the fiber membranes;
   a junction, wherein the junction is connected to the first header of the membrane module, the source of the gas, and the source of the cleaning liquid;
   a tank having means for introducing the cleaning liquid, wherein the membrane module is positioned within the tank so as to be immersed in an activated sludge; and
   means for forming the activated sludge within the tank.

31. A method of operating a membrane bioreactor, the method comprising the steps of:
   providing a membrane module comprising a plurality of porous hollow membrane fibers mounted at a first end to a first potting head and at a second end to a second potting head and extending longitudinally between the potting heads, the membranes having a plurality of pores, the membrane fibers being arranged in close proximity to one another and mounted to prevent excessive movement therebetween, the fibers being partitioned into one or more bundles at least at or adjacent to one of the potting heads so as to form a space therebetween, at least one of the potting heads having an array and a connection to a junction, wherein the junction is connected to a gas source and a source of a liquid comprising a cleaning chemical, the junction providing within the module, through a plurality of aeration openings formed in the array, a plurality of gas bubbles entrained within the liquid, such that, in use, the gas bubbles move past outer surfaces of the membrane fibers to dislodge fouling materials therefrom;
   providing a tank, wherein the membrane module is at least partially immersed in the tank;
   introducing a feed to the tank; and
   applying a vacuum to the fibers to withdraw a filtrate therefrom while periodically or continuously supplying a plurality of gas bubbles through the aeration openings to within the module such that, in use, the gas bubbles move past the outer surfaces of the membrane fibers to dislodge fouling materials therefrom.

32. The method according to claim 31, wherein the gas bubbles are entrained or mixed with a liquid flow when fed through the aeration openings.

33. The membrane bioreactor according to claim 31, wherein the membrane module is suspended vertically within the tank and a further source of aeration is provided beneath the suspended module.

34. The membrane bioreactor according to claim 33, wherein the further source of aeration comprises a group of air permeable tubes or gas distributors.

35. A membrane bioreactor comprising:
   a tank having a feed inlet;
   a source of oxygen for forming an activated sludge within the tank;
   a source of a gas; and
   a membrane module, the membrane module comprising a first header, the first header having one or more holes formed therein through which the gas and the liquid are introduced; a second header; and a plurality of porous hollow fiber membranes, the porous hollow fiber membranes being arranged in close proximity and mounted to prevent excessive movement therebetween, the porous hollow fiber membranes being fixed at a first end in the first header and at a second end in the second header; a junction, wherein the junction is connected to the first header, the source of the gas, and the source of the cleaning liquid; the membrane module positioned within the tank so as to be immersed in the sludge, and the membrane module provided with a pump for withdrawing a filtrate from at least one end of the fiber membranes.

* * * * *